United States Patent Office 3,579,521
Patented May 18, 1971

3,579,521
PRODUCTION OF VINYL SUBSTITUTED AROMATICS FROM METHYL SUBSTITUTED AROMATICS
Raymond A. Franz, Kirkwood, Mo., assignor to Monsanto Company, St. Louis, Mo.
No Drawing. Filed Jan. 15, 1969, Ser. No. 791,482
Int. Cl. C07c *3/00, 15/24;* C07d *31/20*
U.S. Cl. 260—290     9 Claims

ABSTRACT OF THE DISCLOSURE

Vinyl substituted aromatic compounds are produced in a non-catalytic process by contacting a methyl substituted aromatic compound with an oxygen containing organic compound selected from the group consisting of acetic acid, dimethyl ether, di-t-butyl peroxide and diketene. The contacting is carried out at a temperature of from about 700 to about 950° C. at a pressure of not more than four atmospheres absolute.

BACKGROUND OF THE INVENTION

This invention relates to a method for making vinyl substituted aromatic compounds from methyl substituted aromatic compounds. More particularly, this invention relates to a non-catalytic process for producing vinyl substituted aromatic compounds by contacting a methyl substituted aromatic compound with an oxygen containing organic compound in a thermal reaction zone.

During the past few years vinyl substituted aromatic compounds such as styrene have become important materials for producing various polymers. Such polymers can range from the rubbery butadiene and styrene type co-polymers to the rigid resinous polystyrene plastic materials. Since polymers, containing vinyl substituted aromatic compounds, are being used in increased quantities, there is a need for new and improved methods for making vinyl substituted aromatic monomers.

Currently, styrene is made in commercial quantities by reacting ethylene with benzene, in the presence of a suitable catalyst to form ethylbenzene. The ethylbenzene must then be dehydrogenated to produce styrene. Since benzene is an expensive starting material, it is evident that methods for making styrene using cheaper starting materials, such as toluene, would be valuable contributions to the art.

In view of the desirability of making vinyl substituted aromatic compounds from readily available starting materials, I have developed a new process for making vinyl substituted aromatic compounds from methyl substituted aromatic compounds.

SUMMARY OF THE INVENTION

Briefly stated, my invention comprises a simple one-step process wherein a methyl substituted aromatic compound is contacted with an oxygen containing organic compound selected from the group consisting of acetic acid, dimethyl ether, di-t-butyl peroxide and diketene at a temperature of from about 700 to 950° C. The contacting is carried out at a pressure of up to four atmospheres absolute.

It is the object of my invention to provide a new method for making monomeric vinyl substituted aromatic compounds. Another object of my invention is to provide a process for making styrene from toluene in a simple one-step process. A further object of my invention is to provide a thermal process for producing monomeric styrene at relatively low temperatures and pressures, without the concurrent production of polystyrene.

Other objects, advantages and features of my invention will be apparent to those skilled in the art upon examination of the following disclosure and the claims.

DESCRIPTION OF PREFERRED EMBODIMENTS

My invention is directed to the production of monomeric vinyl substituted aromatic compounds from methyl substituted aromatic compounds. According to my invention, monomeric vinyl substituted aromatic compounds are produced in significant quantities by contacting a methyl substituted aromatic compound with an oxygen containing organic compound selected from the group consisting of glacial acetic acid, dimethyl ether, di-t-butyl peroxide and diketene in a thermal reaction zone. Mixtures of the oxygen containing compounds can be used in the practice of my invention. The contacting is carried out at a temperature of from about 700 to about 950° C. The most preferred temperature range is from about 750 to about 900° C. I have found that temperature of below 700° C. will produce little vinyl substituted aromatic monomer, even when the contact times are prolonged. While styrene can be produced above 950° C., when the methyl substituted compound is toluene, problems are encountered by excessive polymerization of the styrene in the reaction vessels and transfer lines. I have also found that temperatures of above 950° C. tend to increase the production of by-product materials that are less valuable than monomeric sytrene and monomeric vinyl naphthalene. This of course decreases the desired yield of vinyl substituted aromatic compound based on the amount of methyl substituted aromatic compound converted in the reaction.

The pressure that is employed in contacting the methyl substituted aromatic compound with the oxygen containing organic compounds, according to my invention should be no greater than four atmospheres absolute. There is no minimum limit on the pressure that can be employed in my invention. I have found that pressures above four atmospheres absolute tend to produce increased amounts of such materials as ethylbenzene and ethylnaphthalene, with a corresponding decrease in the monomeric styrene and monomeric vinyl naphthalene production.

The time for contacting the reactants according to my invention can vary from about 0.01 second to about 60 seconds. The most preferred contact time is from about 0.1 second to about 20 seconds. The contact time is somewhat dependent upon the reaction temperature, with longer contact times being required as the reaction temperature is decreased.

The mol ratio of methyl substituted aromatic compound to total oxygen containing organic compound is in the range of about 3:1 to about 1:10. The most preferred mol ratios are from about 1:1 to about 1:5.

The diketene oxygen containing organic compound that is used in one of the embodiments of my invention is dimerized ketene. This dimer is well known in the art and can be obtained by the thermal dimerization of ketene.

The methyl substituted aromatics utilized in my invention are hydrocarbons having a benzene or pahthalene nucleus with at least one methyl substituent and methyl substituted pyridines. Examples of useful methyl substituted aromatic compounds are toluene, 1-methyl naphthalene, 2-methyl naphthalene, 2-methyl pyridine, 3-methyl pyridine and 4-methyl pyridine. When toluene is utilized in my invention, styrene is formed. Vinyl naphthalene is formed when the methyl naphthalenes are used. Vinyl pyridine are formed when the methyl substituted pyridines are used as starting materials. The methyl substituted aromatic hydrocarbons are the preferred starting materials of my invention. Toluene is the most preferred reactant material of my invention.

In addition to significant amounts of vinyl substituted aromatic compounds that are made when my invention is practiced, other valuable compounds such as benzene and naphthalene are made when toluene and methyl substituted naphthalenes are reactants.

In carrying out my invention, it may be desired in some instances to utilize an inert diluent such as nitrogen, helium, and the like. Whenever a diluent is used however, the conversion of methyl substituted aromatic compound into the desired monomeric vinyl substituted aromatic compound is usually decreased at a given reaction temperature and contact time.

Any suitable reactor can be utilized for carrying out my invention, so long as the temperature, pressure and residence times set forth above are met. One such suitable reactor is a tubular reactor. The tubular reactor can be constructed of any suitable material.

It is preferred that the reactant materials be preheated and vaporized and thoroughly mixed prior to charging them to the reactor. I generally prefer to preheat the vaporized reactants to a temperature of at least about 300° C. prior to charging them to the reactor. In some instances, the reactor and preheater may be packed with known inert packing materials to aid in heat transfer of heat to the reactant materials flowing through the preheater and reactor. The packing also improves mixing of the reactants in the preheater and reactor.

It is necessary to rapidly quench the effluent from the reactor to prevent undesirable side reactions and undersirable thermal polymerization of the vinyl substituted aromatic compound in the effluent. This rapid quenching can be carried out in any manner known to those skilled in the art.

Monomeric vinyl substituted aromatic compounds can be recovered from the quenched reactor effluent and purified according to known purification techniques.

Styrene made according to my invention has utility in the production of polymeric materials such as butadiene and styrene rubber and resinous polystyrenes that can be shaped and formed into various articles.

Unreacted toluene, recovered from the reactor effluent can be recycled to the reactor for further reaction.

In order to further illustrate my invention, the following examples are presented. It is understood that the conditions, proportions and operating techniques set forth in these examples are illustrative only and should not be construed to unduly limit my invention.

EXAMPLE I

A series of runs was carried out utilizing a stainless steel tubular reactor that was heated with a heating coil wrapped around the reactor. A stainless steel thermocouple was passed into the center of the reaction zone to sense the temperatures during the runs. A stainless steel preheat zone was fitted into the reactant transmission line adjacent the inlet to the reactor. The stainless steel used in the construction of the apparatus was 316 stainless steel. Toluene and glacial acetic acid were passed into the preheat section of the apparatus where both reactants were vaporized and thoroughly mixed. The vaporized reactants were preheated to a temperature of approximately 300° C. in the preheat section of the apparatus. The effluent from the reaction zone was cooled by passing it through a water-cooled condenser section followed by a series of U-tube condensers, cooled in a dry bath wherein the reaction products were recovered. The runs were carried out at atmospheric pressure.

The following table gives the amounts of reactants charged per unit time, reaction temperatures, residence times, percent of toluene converted and percent yield of styrene and benzene calculated by the mols of styrene or benzene obtained per unit time divided by mols of toluene converted per unit time multiplied by 100.

TABLE I

| Run | A | B |
| --- | --- | --- |
| Toluene charged, mols | 1 | 3 |
| Acetic acid charged, mols | 1 | 1 |
| Reaction temperature, °C | 720 | 720 |
| Resident time, seconds | 6.6 | 10 |
| Toluene conversion, percent | 13 | 8 |
| Styrene yield, percent | 8 | 9 |
| Benzene yield, percent | 7 | 13 |

EXAMPLE II

Another series of runs was carried out utilizing the same apparatus of Example I, except that the reactor was packed with granulated activated carbon having a mesh size of approximately 8 mesh. In this series of runs, dimethyl ether was reacted with toluene to produce styrene and benzene. 400 parts per million benzenethiol was charged with the toluene to prevent excessive cooking in the reactor.

The following table gives the amounts of reactants charged per unit time, reaction temperatures, residence times, per cent of toluene converted and percent yield of styrene and benzene calculated by the mols of styrene or benzene obtained per unit time divided by mols of toluene converted per unit time multiplied by 100.

TABLE II

| Run | A | B |
| --- | --- | --- |
| Toluene charged, mols | 1 | 2.7 |
| Dimethyl ether charged, mols | 1 | 1 |
| Reaction temperature, °C | 800 | 800 |
| Residence time, seconds | 1 | 1.5 |
| Toluene conversion, percent | 27.4 | 3.9 |
| Styrene yield, percent | 1 | 7 |
| Benzene yield, percent | 7 | 23 |

EXAMPLE III

A series of runs was carried out utilizing di-t-butyl peroxide and toluene as reactants. In this series of runs, 400 parts per million benzenethiol was added with the toluene to prevent excessive coking in the reactors. Run A was carried out utilizing the apparatus and procedure of Example I. Run B was carried out utilizing the apparatus and procedure of Example I except that the reactor was packed with alundum balls (aluminum oxide) of approximately 1/8" diameter.

The following table gives the amounts of reactants charged per unit time, reaction temperatures, residence times, percent of toluene converted and percent yield of styrene and benzene calculated by the mols of styrene or benzene obtained per unit time divided by mols of toluene converted per unit time multiplied by 100.

TABLE III

| Run | A | B |
| --- | --- | --- |
| Toluene charged, mols | 3 | 3 |
| Di-t-butyl peroxide charged, mols | 1 | 1 |
| Reaction temperature, °C | 720 | 800 |
| Residence time, seconds | 10 | 0.5 |
| Toluene conversion, percent | 27 | 27 |
| Styrene yield, percent | 22 | 11 |
| Benzene yield, percent | 22 | 12 |

EXAMPLE IV

A series of runs was carried out utilizing diketene and toluene as reactants. Run A carried out utilizing the same apparatus and procedure of Example I except that 400 parts per million benzenethiol was charged with the toluene to prevent excessive coking in the reactor. Run B utilized the same procedure and apparatus of Example I except that alundum balls (aluminum oxide) having a diameter of 1/8" were packed into the reactor.

The following table gives the amounts of reactants charged per unit time reaction temperatures residence times, percent of toluene converted and percent yield of styrene and benzene calculated by the mols of styrene or benzene obtained per unit time multiplied by 100.

TABLE IV

| Run | A | B |
|---|---|---|
| Toluene charged, mols | 2 | 2 |
| Diketene charged, mols | 1 | 1 |
| Reaction temperature, °C | 720 | 800 |
| Residence time, seconds | 1 | 0.5 |
| Toluene conversion, percent | 33 | 30 |
| Styrene yield, percent | 5 | 13 |
| Benzene yield, percent | 4 | 15 |

EXAMPLE V

A series of runs is carried out using 4-methyl pyridine and various oxygen containing compounds as reactants to produce 4-vinyl pyridine. The apparatus and procedure of Example I is used. The following table gives amounts of reactants charged per unit time, reaction temperatures and residence times for the runs.

TABLE V

| Run | A | B | C | D |
|---|---|---|---|---|
| 4-vinyl pyridine charged, mol | 1 | 1 | 1 | 1 |
| Acetic acid charged, mols | 3 | 0 | 0 | 0 |
| Dimethyl ether charged, mols | 0 | 3 | 0 | 0 |
| Di-t-butyl peroxide charged, mols | 0 | 0 | 3 | 0 |
| Diketene charged, mols | 0 | 0 | 0 | 3 |
| Residence time, second | 1 | 1 | 1 | 1 |
| Reaction temperature, °C | 850 | 850 | 850 | 850 |

4-vinyl pyridine is produced in excess of 5 percent yields based on amount of 4-methyl pyridine reacted and at least 10 percent of the 4-methyl pyridine charged is reacted in each of the runs It will be apparent to those skilled in the art from the above disclosure that various modifications can be made in my invention without departing from the spirit or scope thereof.

I claim:

1. A process for producing a vinyl substituted aromatic compound which comprises contacting a methyl substituted aromatic compound selected from the group consisting of toluene methyl substituted naphthalenes and methyl substituted pyridines with at least one oxygen containing organic compound selected from the group consisting of acetic acid, dimethyl ether, di-t-butyl peroxide and diketene at a temperature of from about 700 to about 950° C. and at a pressure of not more than about four atmospheres absolute, wherein the mol ratio of methyl substituted aromatic compound to oxygen containing organic compound is from about 1:10 to about 3:1.

2. The process of claim 1 wherein said contacting is for a period of from about 0.01 second to about 60 seconds.

3. The process of claim 2 wherein said methyl substituted pyridine is selected from the group consisting of 2-methyl pyridine 3-methyl pyridine and 4-methyl pyridine.

4. The process of claim 2 wherein said methyl substituted aromatic compound is selected from the group consisting of toluene, 1-methyl naphthalene and 2-methyl naphthalene.

5. The process of claim 4 wherein said methyl substituted aromatic compound is toluene.

6. The process of claim 5 wherein said oxygen containing compound is glacial acetic acid.

7. The process of claim 5 wherein said oxygen containing compound dimethyl ether.

8. The process of claim 5 wherein said oxygen containing compound is di-t-butyl peroxide.

9. The process of claim 5 wherein said oxygen containing compound is diketene.

References Cited

Given J. Chem. Soc., London, 1948, pp. 2154–58.

NORMA S. MILESTONE, Primray Examiner

H. I. MONATZ, Assistant Examiner

U.S. Cl. X.R.

260—669